United States Patent [19]

Stewart

[11] Patent Number: 5,185,116

[45] Date of Patent: Feb. 9, 1993

[54] PREPARING SHAPED STRUCTURE OF POLYARYLATE COPOLYMERS HAVING HIGH TENSILE ELONGATION AT BREAK

[75] Inventor: Charles W. Stewart, Newark, Del.

[73] Assignee: E. I. Du Pont de Nemours and Company, Wilmington, Del.

[21] Appl. No.: 715,599

[22] Filed: Jun. 14, 1991

Related U.S. Application Data

[62] Division of Ser. No. 414,412, Sep. 29, 1989, Pat. No. 5,064,704.

[51] Int. Cl.$^5$ .............................................. B29C 47/90
[52] U.S. Cl. ........................... 264/178 F; 156/244.12; 264/174; 264/210.8; 264/288.4
[58] Field of Search .............. 264/210.7, 210.8, 178 F, 264/178 R, 210.1–210.2, 288.4, 174; 156/211.12

[56] References Cited

U.S. PATENT DOCUMENTS

| | | | |
|---|---|---|---|
| 4,145,474 | 3/1979 | Kertscher et al. | 264/174 |
| 4,165,957 | 8/1979 | Kertscher | 264/174 |
| 4,287,332 | 9/1981 | Jackson et al. | 264/210.5 |
| 4,451,306 | 5/1984 | Verne | 264/210.1 |
| 4,734,240 | 3/1988 | Chung et al. | 264/211.13 |
| 4,755,336 | 7/1988 | Deeg et al. | 264/210.5 |

FOREIGN PATENT DOCUMENTS 232777 8/1987 European Pat. Off. .
62-255113 11/1987 Japan .

*Primary Examiner*—Jeffery Thurlow

[57] ABSTRACT

Extruded shaped structures of amorphous polyarylate copolymers, having a tensile elongation at break of at least 80% at 25° C., are made by drawing a molten extrudate of the copolymer at a temperature at least 100° C. above the glass transition temperature of the copolymer.

9 Claims, No Drawings

PREPARING SHAPED STRUCTURE OF POLYARYLATE COPOLYMERS HAVING HIGH TENSILE ELONGATION AT BREAK

CROSS-REFERENCE TO RELATED APPLICATION

This is a division of application Ser. No. 07/414,412 filed Sep. 29, 1989 and allowed May 13, 1991, now U.S. Pat. No. 5,064,704.

BACKGROUND OF THE INVENTION

Field of the Invention

This invention relates to amorphous aromatic polyester copolymers having high tensile elongation at break.

Background

Polyarylates are known to have excellent physical properties, with the exception that they have a very low tensile elongation at break. This low tensile elongation limits their usefulness. The outstanding physical properties of polyarylates make them ideal candidates for specialty wire and cable applications, such as primary insulation for telephone exchange wire and as insulation and jacketing for plenum cable. These properties include low dissipation factor, low dielectric constant, low flammability and smoke evolution, high resistivity, high end use temperature and excellent processing behavior. However, until this invention, polyarylates have been excluded from these and other applications because of their low tensile elongation at break. Typically, the tensile elongation at break of compression molded polyarylate films is between 10 and 40%. Such low values for the tensile elongation at break leads to failure even in relatively mild bending tests.

It is known that cold drawing of crystalline polymers increases the tensile strength and tensile modulus, but tensile elongation at break is ordinarily decreased. Amorphous polymers usually break instead of cold drawing. Hot drawing of amorphous polymers has been carried out (Japanese Kokai 62/255113; U.S. Pat. No. 4,734,240; and EP 232777) to increase the tensile modulus and elongation at break, but this drawing is always done within about 50° C. of the glass transition temperature.

DETAILED DESCRIPTION OF THE INVENTION

The invention herein resides in extruded and drawn shaped structures of an amorphous polyarylate copolymer, the shaped structure having in its drawn dimension, that is, the direction of drawing, a tensile elongation at break of at least 80% at 25° C., preferably at least 100%, more preferably at least 200%. The tensile elongation at break is measured in the same direction as the draw; generally, this is the longest direction of the shaped structure. Such shaped structures are produced by melt drawing the molten copolymer extrudate exiting the extruder, at a certain draw ratio and at a temperature which is at least 100° C. above the glass transition temperature of the copolymer. More specifically, the amorphous copolymer is drawn, as it exits the extruder, at a temperature which is at least 100° C., preferably 120°-200° C., above its glass transition temperature. The polyarylate copolymer remains amorphous after the drawing step. The draw ratio is determined from a consideration of the temperature of the extrudate and the desired tensile elongation at break of the shaped structure ultimately produced. For most applications the draw ratio will be greater than about 5:1. Shaped structures that can be made by the process of the invention include insulation and jacketing for wire and cable, filaments and films.

The amorphous polyarylate copolymers used in this invention are made from aromatic dicarboxylic acids and diphenols wherein no more than one chain carbon atom per repeat unit is an aliphatic carbon atom. The dicarboxylic acid and diphenol are reacted at a mole ratio of about 1:1. The dicarboxylic acids are selected from the class consisting of isophthalic acid, terephthalic acid, substituted isophthalic or terephthalic acid, and mixtures thereof. The diphenols are selected from the class consisting of bisphenol A, substituted bisphenol A, hydroquinone, substituted hydroquinone, resorcinol, substituted resorcinol, and mixtures thereof.

As the term "copolymer" is used herein, it is intended to be limited to polyarylates which are prepared from a mixture of at least two dicarboxylic acids and/or a mixture of at least two diphenols.

The number average molecular weight of the polyarylate copolymer is greater than 10,000 by gel permeation chromatography (GPC), calibrated using a polystyrene standard. The copolymer has an inherent viscosity greater than 0.3 dL/g measured at a concentration of 0.5 g/100 mL in a trifluoroacetic acid/$CH_2Cl_2$ mixture (50:50 by wt) at 25° C. The molecular weight and inherent viscosity of the copolymer are substantially unchanged during the extrusion process of the invention.

Data on birefringence are presented in the examples which follow because birefringence is a convenient method for determining the degree of molecular orientation. For further information and a bibliography, see Ballman and Toor, S. P. E. Technical Papers, Vol. 5 (1959).

EXAMPLE 1

An amorphous polyarylate copolymer of bisphenol A (BA), isophthalic acid (I), and terephthalic acid (T) (BA/I/T, 50/48.5/1.5 mole %; inherent viscosity 0.5 dL/g; glass transition temperature 183° C.) was extruded as a filament from a 25.4 mm single screw Haake Rheochord ® extruder equipped with a die, using an extrusion temperature profile in which the rear barrel, center barrel, front barrel, and die were all held at 300° C. The die was 4.8 mm in diameter and 12.7 mm in length. Screw speed was 20 rpm. Melt temperature at the die was 305° C. Rate of extrusion was 15 g/min. After exiting the die, the molten polymer was immediately drawn in air to the desired draw-down ratio and was wound on a take-up spool. Draw-down ratio was controlled by varying the speed of the take-up spool. The polymer was allowed to cool in air on the spool. The draw-down ratio was determined as the ratio of the cross sectional area of the die to the cross sectional area of the drawn filament.

After allowing the extruded and drawn polymer filament to come to equilibrium at 25° C. for 24 h, sections of the filament covering a range of draw down ratios were selected for testing. Tensile tests (ASTM D-412) were run on the selected filaments. Table 1 shows the tensile strength and elongation at break of the samples tested, as a function of the draw down ratio. Column 1 of this table gives the draw down ratio (DDR). Column 2 gives the tensile strength (TS) in MPa. Column 3 gives the elongation at break (EAB) in percent (ASTM D-412). Column 4 gives the birefringence (B) as the difference ($\Delta n$) in refractive indices in the direction parallel ($n_{pl}$) and the direction perpendicular ($n_{pr}$) to the direction of draw, that is, $\Delta n = n_{pl} - n_{pr}$. The greater the $\Delta n$, the greater the amount of draw of the filament.

TABLE 1

| DDR | TS(MPa) | EAB(%) | B ($\Delta n \times 10^5$) |
| --- | --- | --- | --- |
| 3:1 | 51 | 80 | 40 |
| 9:1 | 62 | 120 | 170 |
| 40:1 | 88 | 180 | 250 |
| 90:1 | 95 | 146 | 500 |
| 200:1 | 108 | 116 | 1150 |
| 265:1 | 157 | 100 | NM |
| 549:1 | 192 | 65 | NM |

NM means not measured

It may be seen that at draw ratios between 3:1 and 9:1, that is, about 5:1, to at least about 265:1 the elongation at break of the BA/I/T polyarylate is greater than 100%, and that at draw ratios outside this range, the elongation at break is less than 100%. Differential Scanning Calorimeter (DSC) curves were obtained, using a Du Pont 990 Thermal Analyzer at a heating rate of 20° C./min., for samples at each draw ratio listed in Table 1. It was observed that none of the drawn samples exhibited any measurable degree of crystallinity.

EXAMPLE 2

Example 1 was repeated except that the rear barrel, center barrel, front barrel, and die were all held at 330° C.; melt temperature at the die was 335° C. After exiting the die, the molten polymer was immediately drawn in air to the desired draw-down ratio, as in the previous example.

After allowing the extruded and drawn polymer filament to come to equilibrium at 25° C. for 24 h, sections of the filament covering a range of draw-down ratios were selected for testing. The results are shown in Table 2.

TABLE 2

| DDR | TS(MPa) | EAB(%) | B ($\Delta n \times 10^5$) |
| --- | --- | --- | --- |
| 10:1 | 66 | 100 | 11 |
| 60:1 | 68 | 136 | 170 |
| 190:1 | 93 | 141 | 290 |

In the range of draw ratios selected, the elongation at break of the BA/I/T polyarylate is at least 100%. When these results are compared with those of Example 1, it may be seen that, as the melt temperature at the die is increased, a higher draw-down ratio is required to achieve 100% elongation at break. DSC curves, obtained as in Example 1, showed that none of the drawn filaments exhibited any measurable degree of crystallinity.

EXAMPLE 3

Example 1 was repeated except that the polyarylate was an amorphous polyarylate copolymer of resorcinol (R), isophthalic acid (I), and terephthalic acid (T) (R/I/T, 50/25/25 mole %; inherent viscosity dL/g; glass transition temperature 145° C.). The results are shown in Table 3.

TABLE 3

| DDR | TS(MPa) | EAB(%) |
| --- | --- | --- |
| 20:1 | 83 | 198 |
| 200:1 | 110 | 163 |

It may be seen that in the range of draw ratios selected the elongation at break of the R/I/T polyarylate is greater than 100%. DSC curves, obtained as in Example 1, showed that none of the drawn filaments exhibited any measurable degree of crystallinity.

EXAMPLE 4

The amorphous polyarylate copolymer used in Example 3 was extruded under the temperature conditions of Example 2. The results are shown in Table 4.

TABLE 4

| DDR | TS(MPa) | EAB(%) | B ($\Delta n \times 10^5$) |
| --- | --- | --- | --- |
| 12:1 | 50 | 52 | 70 |
| 20:1 | 60 | 63 | 100 |
| 70:1 | 62 | 105 | 150 |
| 155:1 | 89 | 105 | 210 |

It may be seen that at draw-down ratios between about 70:1 and 155:1 the elongation at break of the R/I/T polyarylate is at least 100%. Again it has been shown that, as the melt temperature at the die is increased, a higher draw-down ratio is required to achieve 100% elongation at break. DSC curves, obtained as in Example 1, showed that none of the drawn filaments exhibited any measurable degree of crystallinity.

EXAMPLE 5

Example 1 was repeated except that the polyarylate was an amorphous polyarylate copolymer of hydroquinone (H), bisphenol A (BA), and isophthalic acid (I) (H/BA/I, 30/20/50 mole %; inherent viscosity 0.6 dL/g; glass transition temperature 178° C.). The results are shown in Table 5.

TABLE 5

| DDR | TS(MPa) | EAB(%) | B ($\Delta n \times 10^5$) |
| --- | --- | --- | --- |
| 10:1 | 65 | 122 | 70 |
| 70:1 | 78 | 182 | 130 |
| 208:1 | 107 | 213 | 980 |

It may be seen that in the range of draw ratios selected the elongation at break of the H/BA/I polyarylate is greater than 100%. DSC curves, obtained as in Example 1, showed that none of the drawn filaments exhibited any measurable degree of crystallinity.

EXAMPLE 6

Telephone primary wire constructions were made on a 60 mm extruder fitted with a wire coating crosshead. The telephone primary constructions were 0.511 mm copper wire substrate with 0.127 mm of insulation. The amorphous polyarylate copolymer used in Example 1 was extrusion coated onto the wire using a tubing technique. Extrusion temperature profile was as follows: rear barrel 329° C., center barrel 360° C., front barrel 351° C., adaptor 351° C., crosshead 358° C. and die 362° C. Temperature of the resin melt was 353° C. Crosshead tooling was selected to give a draw-down ratio of 9:1 with a wall thickness of 0.127 mm. Die diameter was 2.57 mm and guide tip diameter (land) was 1.91 mm. Wire preheat Was 150° C. Wire coating line speed was 174 m/min. Air gap was 1 m followed by a liquid (cold water) quench.

A section 1 m long was cut from the coated wire. The polyarylate insulation was stripped from the section of wire and was tested (ASTM D-412) for tensile strength and elongation at break. Table 6 shows the tensile strength and elongation at break of the samples tested.

TABLE 6

| DDR | TS(MPa) | EAB(%) |
|-----|---------|--------|
| 9:1 | 69 | 172 |

A second section 0.1 m long was cut from the coated wire and was wrapped tightly around a mandrel 1 mm in diameter. There were no cracks or flaws observed in the polyarylate insulation after being wrapped around the mandrel.

It may be concluded from this that when the polyarylate insulation is coated onto the wire with a sufficiently high draw-down ratio to increase the elongation at break to 172%, the coated wire can be wrapped tightly around a small mandrel with no cracks or flaws developing in the insulation.

COMPARISON EXAMPLE A

To show the effect of draw-down ratio, Example 6 was repeated with the following variations so as to achieve about the same wall thickness as in Example 6: draw-down ratio was 1.2:1; die diameter was 0.842 mm; land was 0.4 mm; and wire coating speed was 100 m/min. The temperature of the resin melt was 358° C. Table 7 shows the tensile strength and elongation of the samples tested.

TABLE 7

| DDR | TS(MPa) | EAB(%) |
|-----|---------|--------|
| 1.2:1 | 47 | 50 |

A second section 0.1 m long was cut from the coated wire and was wrapped tightly around a mandrel 1 mm in diameter. It was observed that the polyarylate insulation cracked while being wrapped around the mandrel, with several cracks appearing in each turn. It can be concluded from this that when the polyarylate insulation is coated onto the wire with a draw-down ratio that is insufficient to increase the elongation at break, the coated wire cannot be wrapped tightly around a small mandrel without cracks or flaws developing in the insulation. Such an insulation would be unacceptable in practice.

I claim:

1. Process of extruding and drawing a polymer so as to form a drawn shaped structure having a tensile elongation at break in the drawn direction of greater than 80% at 25° C., the process comprising extruding into an extrudate an amorphous polyarylate copolymer of an aromatic dicarboxylic acid and a diphenol wherein no more than one chain carbon atom per repeat unit is an aliphatic carbon atom, said copolymer having a number average molecular weight greater than 10,000, said process further comprising drawing the extrudate at a temperature at least 100° C. above the glass transition temperature of the polyarylate copolymer, and thereafter cooling the drawn extrudate and recovering an amorphous shaped and drawn structure having a tensile elongation at break in the drawn direction of greater than 80% at 25° C.

2. Process of claim 1 wherein the drawn extrudate is cooled in a liquid.

3. Process of claim 2 wherein the liquid is water.

4. Process of claim 1 wherein the drawn extrudate is cooled in air.

5. Process of claim 1 wherein the shaped structure has a tensile elongation at break of at least 100%.

6. Process of claim 1 wherein the shaped structure has a tensile elongation at break of at least 200%.

7. Process of claim 1 where the extrudate is drawn at a draw ratio of at least 5:1.

8. Process of claim 1 wherein the draw temperature is 120°–200° C. above the glass transition temperature of the polyarylate copolymer.

9. Process of claim 1 wherein the amorphous polyarylate copolymer is a copolymer of one or more of isophthalic acid, substituted isophthalic acid, terephthalic acid, substituted terephthalic acid, and one or more of bisphenol A, substituted bisphenol A, hydroquinone, substituted hydroquinone, resorcinol and substituted resorcinol.

* * * * *